M. M. EVANS.
TELESCOPING REACH POLE FOR VEHICLES.
APPLICATION FILED SEPT. 12, 1917.
1,277,890.
Patented Sept. 3, 1918.
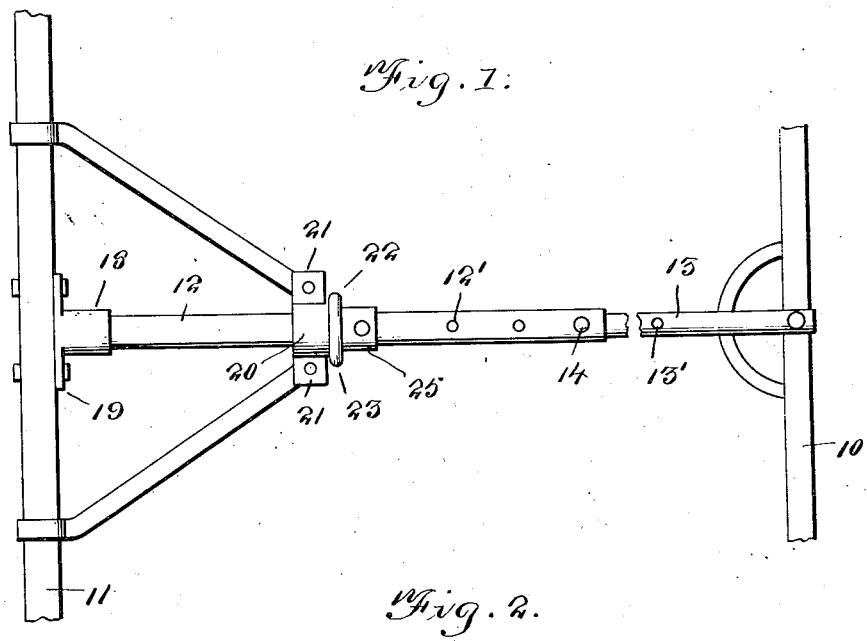
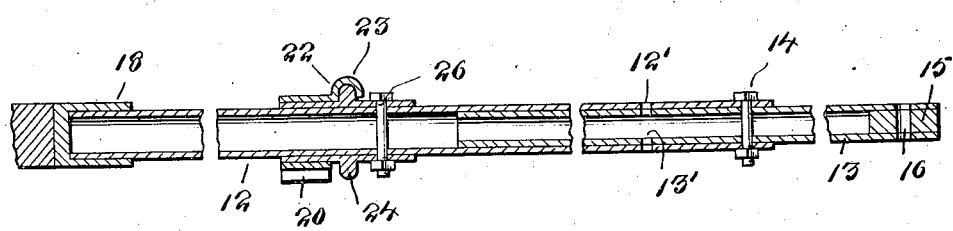
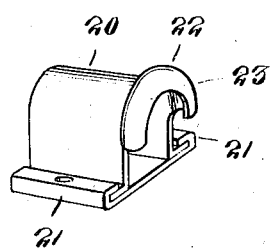
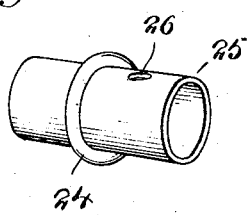
Witness
E. R. Ruppert
E. M. Springer
Inventor
M. M. Evans.
By Victor J. Evans
Attorney

UNITED STATES PATENT OFFICE.

MELVIN M. EVANS, OF FLORA, OREGON.

TELESCOPING REACH-POLE FOR VEHICLES.

1,277,890.

Specification of Letters Patent.   Patented Sept. 3, 1918.

Application filed September 12, 1917. Serial No. 190,993.

*To all whom it may concern:*

Be it known that I, MELVIN M. EVANS, a citizen of the United States, residing at Flora, in the county of Wallowa and State of Oregon, have invented new and useful Improvements in Telescoping Reach-Poles for Vehicles, of which the following is a specification.

This invention relates to a telescoping reach pole for a vehicle, and the object is to provide improved means for mounting a pole of the character specified whereby injury to the wagon structure due to the usual wrenching action when one wheel falls into a rut or other depression, is prevented.

A further object is to provide a plurality of telescoping tubular members adapted to be secured in any adjusted position, with means connected with the rear axle for mounting one of said members and means for preventing the aforesaid wrenching action.

With the foregoing and other objects in view, the invention consists in the novel construction, combination and arrangement of elements hereinafter described and claimed.

In the accompanying drawings,

Figure 1 is a top plan view,

Fig. 2 is a longitudinal section,

Fig. 3 and 4 are perspective views showing details of construction.

The front axle of the wagon is designated 10, the rear axle 11, and extending between these axles is the reach embodying with the mounting means therefor the subject matter of this application. One of the telescoping members of the reach is shown at 12 and the other is designated 13, the latter being connected with the front axle. Each member 12 and 13 is provided with a series of apertures in opposite sides thereof and designed to register with apertures similarly formed in member 12. The apertures may be spaced apart at a distance of say two feet, in order to provide for adjustment between the axles to the extent indicated. The apertures in member 12 are designated 12' and in member 13 they are shown at 13'. A pin for connecting the telescoping members is designated 14. The forward end of member 13 may be reinforced with a block or plug 15 provided with an aperture 16 registering with the corresponding apertures in the end of member 13 and providing for the accommodation of the king bolt.

A sleeve or the like designated 18 passes through the rear axle and is connected therewith by means of bolts or other securing devices passing through offset portions 19 located at one end of said sleeve. The tubular member 12 passes through sleeve 18.

In order to prevent the aforesaid wrenching action when one wheel of the vehicle falls into a rut or depression, I provide a particular type of coupling including a bracket 20 provided with laterally extending members 21, permitting the bracket to be secured in position and also provided with flanged portion 22 of segmental form and including a channeled portion 23 for coöperation with the flanged portion 24 of a sleeve 25, the latter having apertures 26 oppositely located and designed to register with the apertures of the member 12.

This construction permits of the movement of the hounds and the relative movement of the parts specified.

What is claimed is:

In a device of the class described, a reach including a plurality of telescoping members, means for connecting one of said members with the front axle, a sleeve connected with said member last named, and having an annular flange thereon, an inverted U-shaped bracket inclosing the sleeve and including laterally extending members, bracing means connecting said laterally extending members with the rear axle, and a channeled flange overhanging the edge of the curved portion of the U-shaped bracket and engaging the annular flange carried by the sleeve and permitting slight rocking movement between the bracket and the sleeve in a direction in approximate alinement with the transverse axis of the sleeve.

In testimony whereof I affix my signature.

MELVIN M. EVANS.